United States Patent
Robinson

[15] 3,667,320
[45] June 6, 1972

[54] WAVE GENERATOR CONFIGURATIONS

[72] Inventor: Hugh A. Robinson, Wenham, Mass.
[73] Assignee: USM Corporation, Boston, Mass.
[22] Filed: Jan. 18, 1971
[21] Appl. No.: 107,038

[52] U.S. Cl. ................................................. 74/640
[51] Int. Cl. ........................................... F16h 37/04
[58] Field of Search ...................................... 74/640

[56] References Cited

UNITED STATES PATENTS

| | | | |
|---|---|---|---|
| 2,930,254 | 3/1960 | Musser et al. | 74/640 |
| 2,943,513 | 7/1960 | Musser | 74/640 |
| 2,931,248 | 4/1960 | Musser | 74/640 |

Primary Examiner—Arthur I. McKeon
Attorney—Richard A. Wise, Richard B. Megley and Carl E. Johnson

[57] ABSTRACT

In mechanical harmonic drive actuators, an elliptoidal wave shape is employed to generate a circumferential wave of radial deflection. The present invention provides an improved shape for a wave generator cam, specifically a wave generator plug defined by a pair of arc centered on the major axis, a pair of arc centered on the minor axis, and these arcs sharing common points of tangency. Bending stress is reduced in the deflecting member and better load distribution attained in the wave generator bearing.

1 Claims, 3 Drawing Figures

Inventor
Hugh A. Robinson
By his Attorney
Carl E. Johnson

WAVE GENERATOR CONFIGURATIONS

BACKGROUND OF THE INVENTION

In change speed devices of the type employing a circumferentially meshing circular spline and a coaxial flexspline, for instance as disclosed in U.S. Pat. No. 2,906,143, issued Sept. 29, 1959 in the name of C. Walton Musser, a cam or strain inducer of elliptoidal shape may be employed to radially deflect the flexspline and generate circumferentially the localities of meshing of the spline teeth. This wave generating means has commonly comprised a cam having its elliptoidal periphery transmitting radial deflection through a wave generator bearing to create a major axis and a minor axis in a coaxial flexspline. The latter experiences stress in operation, particularly bending stress occurring at roots of the spline teeth, which it is desirable to minimize.

With the conventional harmonic wave generator shape heretofore in use the maximum change in curvature takes place at the major axis. Accordingly maximum bending stress occurs on that axis and is correspondingly imposed on the wave generator bearing. In U.S. Pat. No. 2,930,254, issued March 29, 1960 in the names of C. W. Musser and John H. Carlson, the contour of a wave generator is disclosed as modified to extend the arc of full tooth engagement. For this purpose, as therein proposed and depicted in FIG. 7, for instance, the wave generator periphery comprises a sine wave contour interspaced by lobes adjacent tooth engaging areas, which lobes are formed by circular arcs tangentially connecting the sine wave contour at its greatest distance from the center. It has more recently been determined that the so-called "extended contact" configuration tends to become impractical, not so much from the standpoint of not lowering stress, which it does, but when meshing over an arc to the degree there indicated is used, the teeth must come out of interengagement too rapidly, i.e., they then undergo a period of excessive stress as they proceed into clearance with the non-deflected teeth.

SUMMARY OF THE INVENTION

It accordingly is an object of this invention to provide in a harmonic drive type actuator an improved wave generator having a novel shape whereby lower bending stress is incurred in the flexing member than experienced in the single tooth contact disclosed in the U.S. Pat. No. 2,906,143, for instance, and a more uniform load distribution is experienced by a cooperating wave generator bearing. The improved wave generator configuration, by lowering bending stress in a flexspline at the major axis of customary harmonic drive shapes by approximately 25 percent, provides an advantage in that it makes more practicable the use of harmonic drive actuators having a reduction ratio below 50:1 where bending stresses become excessively high. The achievement of a low ratio design will make available a considerably greater market for actuators and transmissions of the harmonic drive type.

In keeping with the foregoing object, a feature of the invention resides in providing a wave generator with a circumferential operating surface comprised of four blended arcs, two of the arcs being centered on the major axis and two on the minor, these arcs sharing common points of tangency. For convenience the herein disclosed novel wave generator contour may hereinafter be referred to as a blended arc shape.

BRIEF DESCRIPTION OF THE DRAWINGS

The foregoing and other features of the invention will now be more particularly described in connection with an illustrative embodiment, and with reference to the accompanying drawings thereof, in which.

DESCRIPTION OF THE PREFERRED EMBODIMENT

Figure 1:
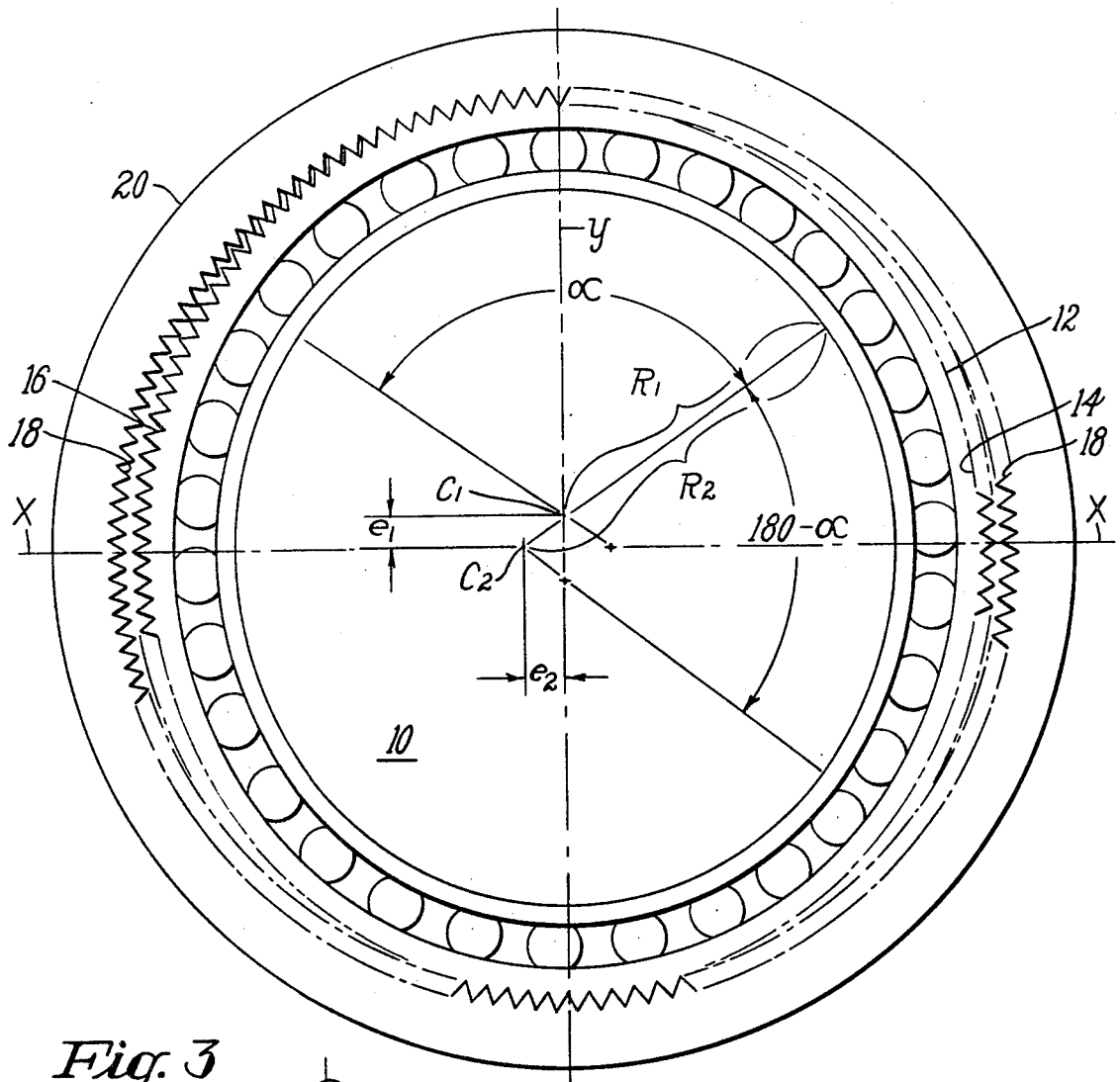
FIG. 1 is a view in end elevation of a harmonic drive actuator according to the invention and including a wave generator plug the blended arc configuration of which is somewhat exaggerated for purposes of clarity.

Referring to FIG. 1, a harmonic drive actuator comprises in coaxial relation a wave generator including an elliptoidal plug 10 and its external wave generator bearing 12, a radially deflectible flexspline 14 having external spline teeth 16 meshing at circumferentially spaced localities with internal spline teeth 18 of a ring gear 20. It will be understood that as customary any one of the three basic elements may be a rotary input, another is stationary or grounded, and the third serves as an output. It will further be appreciated that through the wave generator is herein shown and described as being mounted internally of the deflectible flexspline 14, the invention also contemplates and is applicable to the so-called "inside out" arrangement wherein the wave generator and its bearing acts externally on the flexspline to effect radially inward deflection and consequent circumferentially spaced tooth engagement with an internally disposed ring gear having external teeth. The major axis of the plug 10 and hence of the flexspline 14 is shown at Y—Y of FIG. 1, the minor axis then being X—X.

For the purpose of comparing bending stress in a flexspline deflected by an elliptoidal wave generator having a pair of major axis arcs $\alpha$ (FIG. 1) extending 90° respectively and a pair of minor axis arcs extending 90°, respectively, the arcs having common points of tangency at the 45° points, with such stress in a conventional, i.e., single tooth interengagement, harmonic drive actuator, a formula has been derived relating stress to the respective stressed and relaxed radii of curvature. The formula takes the form $s = Eh(1/R_o - 1/R)$ wherein $s$ = bending stress in lbs/sq. in.
$E$ = Young's modulus (lbs./sq. in.)
$h$ = ring or bed thickness of the flexspline divided by two
$R_o$ = radius of curvature of the round flexspline
$R$ = radius of curvature of the deflected flexspline at the point where stress is being calculated.

Evaluating the term $1/R_o - 1/R$ for making the stress comparison, it is found to be a factor of —0.0327 for the major axis and —0.0325 for the minor axis. The comparable factor for the conventional harmonic shape is found to be —0.0429. The bending stress of the blended arc shape accordingly is 0.0327 divided by 0.0429 or 0.763 times that of the conventional shape.

While the foregoing thus indicates this initially proposed blended arc shape of wave generator insures reduced bending stress by a possible factor of about 25percent, it also involves nearly equal stress factors in the major and minor arcs. A further modification of these arcs is therefore urged to boost the minor axis stress and reduce the major axis stress, assuming an internal wave generator as illustrated. This further modification is advanced because roots of the flexspline teeth 14 are in tension at the major axis while at the minor axis they are in compression. Major axis tension is in addition to localized hoop stress resulting from drive torque. Specifically, therefore, the present invention would increase the included angle of the two major axis arcs, for a harmonic drive actuator of the type depicted, from the initially proposed 90° in order to reduce the combined tensile stress at the roots of the major axis teeth. It being accepted that bearing life is inversely proportional to the ball load cubed, a resultant small change in load distribution can have marked effect on bearing life.

Figure 2:
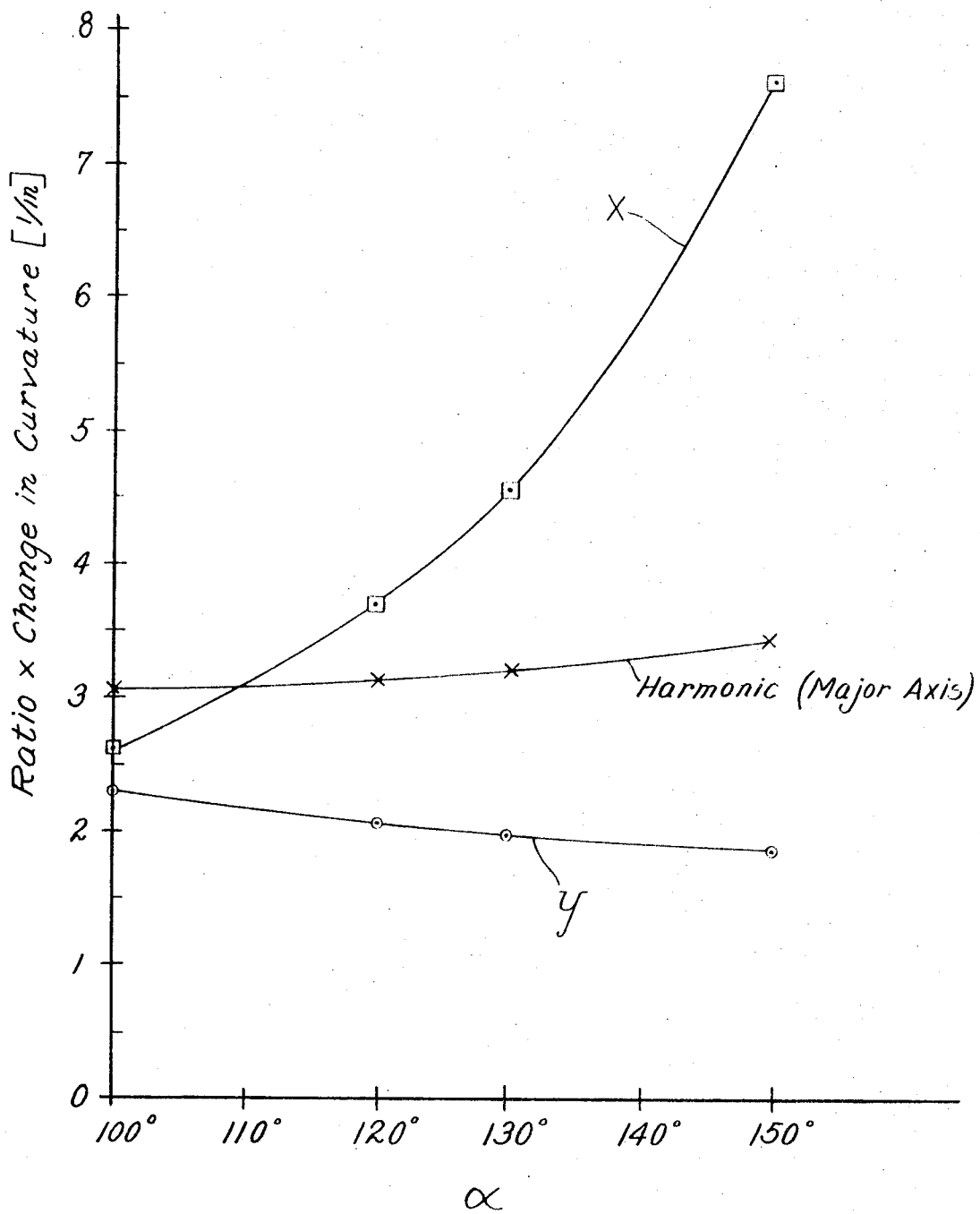
FIG. 2 is a graph indicating change in curvature of the deflecting member vs the included angles of different major and minor axis arcs.

FIG. 2 indicates that the change in curvature at the minor axis can become rather large at higher $\alpha$'s. Thus a practical upper limit for $\alpha$ exists at about 150°. Increasing $\alpha$ will also better distribute the tooth separating load resulting in a lower peak ball loading in the wave generator bearing.

Referring to FIG. 1 it will be noted that as the major axis arcs $\alpha$ increase from 90°, their supplemental or minor axis arcs equaling 180°− $\alpha$ correspondingly diminish and more tooth clearance (i.e., more $d$ deflection) results at the minor axis for a given major axis bending stress. The arc radii $R_1$ and $R_2$ (FIG. 1) and center locations required for constructing blended arc wave generator plugs 10 having predetermined reduction ratios are found from the formulas involving the relationships indicated:

1. $\text{Ratio} = \dfrac{Do}{D \text{ maj. axis} - Do} = \dfrac{2Ro}{2(R_1 + e_1 - R_0)}$ (see FIG. 1 for $e_1$)

2. $R_1 = Ro \dfrac{(\text{Ratio} + 1)}{\text{Ratio}} - e_1$

3. Since circumference round = circumference deflected, $$2\pi Ro = 2(\alpha R_1 + (\pi - \alpha) R_2).$$

Solving for $R_2$, $R_2 = \dfrac{\pi Ro - \alpha R_1}{\pi - \alpha}$

4. $e_1 = (R_2 - R_1) \sin \dfrac{\pi - \alpha}{2}$

5. $e_2 = (R_2 - R_1) \cos \dfrac{\pi - \alpha}{2}$

Knowing the gear ratio, the desired $R_o$, and selecting $\alpha$ greater than 90° for the reasons above indicated, the radii and centers $C_1$, $C_2$ of arc curvature on both axes $Y$ and $X$ can accordingly be determined for the design of proper hardware.

As has been indicated, change in plug or flexspline curvature has been taken as a measure of bending stress in the flexspline. FIG. 2 illustrates for different major axis arcs $\alpha$ in the range of 100°–150°, how change in curvature compares for the major axes of the blended arc wave generator configuration and the conventional, i.e., full tooth meshing, harmonic drive. The lower stress at the major axis for a blended arc generator as $\alpha$ increases will be noted.

Figure 3:
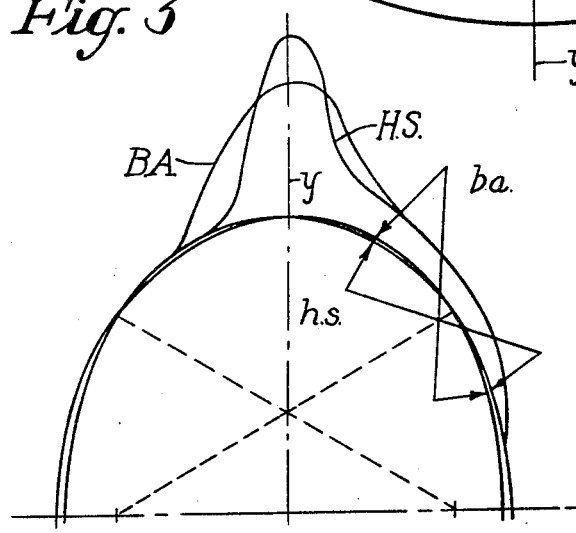
FIG. 3 is a schematic view contrasting the original or single tooth bearing load distribution in corresponding halves of engagement with the improved wave generator contour disclosed herein.

FIG. 3 contrasts the bearing load distribution, B.A. load curve being applicable to blended arc shape ba and H.S. load curve corresponding to usual harmonic shape hs. A flexspline deflected to blended arc shape has closer conformity with the circular spline at the major axis. Under torque loading more teeth come into contact and the tooth separating load will spread out enabling reduction of peak bearing load.

Blended arc wave generator shapes may be employed advantageously with deviated deflection harmonic drive of the type disclosed in U.S. Pat. No. 3,415,143, issued Dec. 10, 1968 in the name of Mr. Shoichi Ishikawa.

Summing up, provision of a blended arc wave generator shape having major axis arcs centered on the major axis and characterized by included angles of approximately 100° to 150°, respectively, and minor axis arcs centered on the minor axis and having included angles of approximately 80° to 30°, respectively, the arcs having common points of tangency, is advantageous in reducing bending stress, and more particularly in improving load distribution in a harmonic drive actuator.

Having thus described my invention, what I claim as new and desire to secure by Letters Patent of the United States is:

1. For use in a harmonic drive type actuator, a wave generator for imparting a circumferential wave of radial deflection to a flexing member, the wave generator having a peripheral shape comprising a pair of major axis arcs centered on its major axis and a pair of arcs centered on the minor axis, the major axis arcs having equal included angles, respectively, of about 90° to 150° and the minor arcs having equal included angles of about 90° to 30°, respectively, said arcs having common points of tangency.

* * * * *